United States Patent
Kai

(10) Patent No.: US 8,145,875 B2
(45) Date of Patent: Mar. 27, 2012

(54) ADDRESS TRANSLATION CIRCUIT FOR A CPU

(75) Inventor: Hitoshi Kai, Kanagawa (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/393,124

(22) Filed: Feb. 26, 2009

(65) Prior Publication Data
US 2009/0222641 A1    Sep. 3, 2009

(30) Foreign Application Priority Data
Feb. 28, 2008 (JP) ............................... P2008-047145

(51) Int. Cl.
*G06F 12/00* (2006.01)
(52) U.S. Cl. ................ 711/202; 711/141; 711/156
(58) Field of Classification Search .............. 711/141, 711/156, 202
See application file for complete search history.

(56) References Cited

U.S. PATENT DOCUMENTS 5,644,748 A * 7/1997 Utsunomiya et al. .......... 711/207
6,101,590 A * 8/2000 Hansen .......................... 711/203

FOREIGN PATENT DOCUMENTS
JP          2704112          10/1997

* cited by examiner

*Primary Examiner* — Reba I Elmore
(74) *Attorney, Agent, or Firm* — Frommer Lawrence & Haug LLP; William S. Frommer; Thomas F. Presson

(57) ABSTRACT

An address translation circuit includes an area address holding section, an invert flag holding section, a match detection section, and a bit conversion section. The area address holding section holds at least part of a translation target address as an area address. The invert flag holding section holds an invert flag specifying whether or not part of said translation target address is to be inverted. The match detection section detects a match between a predetermined part of at least one bit in an input address on the one hand, and said area address held by said area address holding section on the other hand. If a match is detected by said match detection section and if said invert flag held by said invert flag holding section specifies that part of said translation target address is to be inverted, the bit inversion section inverts a predetermined bit part in said input address before outputting the bit-inverted address.

1 Claim, 15 Drawing Sheets

FIG.5

| INPUT ADRESS ||| INVERT FLAG 131 | OUTPUT ADRESS (BITS 14-12) |
|---|---|---|---|---|
| 14 | 13 | 12 | | |
| 1 | 1 | 0 | 0 | "110" (UNTRANSLATED) |
| | | | 1 | "111" (TRANSLATED) |
| OTHERS ||| 0 | INPUT ADRESS (UNTRANSLATED) |
| | | | 1 | |

F I G . 7

| INPUT ADRESS | | | INVERT FLAG 131 | OUTPUT ADRESS (BITS 14-12) |
|---|---|---|---|---|
| 14 | 13 | 12 | | |
| 1 | 1 | 1 | 0 | "111" (UNTRANSLATED) |
| | | | 1 | "110" (TRANSLATED) |
| OTHERS | | | 0 | INPUT ADRESS (UNTRANSLATED) |
| | | | 1 | |

FIG. 9

| | VIRTUAL ADDRESS | L1 ONLY | L1 + L2 | | AFTER PARTIAL SWITCH |
|---|---|---|---|---|---|
| | | L1 | L1 | L2 | L2 |
| KERNEL AREA | 0x7FFF ～ 0x7000 | RESERVED | UNCASHED | UNCASHED | CASHED |
| | 0x6FFF ～ 0x6000 | UNCASHED | UNCASHED | CASHED | UNCASHED |
| | 0x5FFF ～ 0x5000 | RESERVED | CASHED | UNCASHED | CASHED |
| | 0x4FFF ～ 0x4000 | CASHED | CASHED | CASHED | UNCASHED |
| USER AREA | 0x3FFF ～ 0x3000 | RESERVED | UNCASHED | UNCASHED | CASHED |
| | 0x2FFF ～ 0x2000 | UNCASHED | UNCASHED | CASHED | UNCASHED |
| | 0x1FFF ～ 0x1000 | RESERVED | CASHED | UNCASHED | CASHED |
| | 0x0FFF ～ 0x0000 | CASHED | CASHED | CASHED | UNCASHED |

FIG.12

| INPUT ADRESS || INVERT FLAG 131 | OUTPUT ADRESS (BITS 14-13) |
|---|---|---|---|
| 14 | 13 | | |
| 1 | 0 | 0 | "10" (UNTRANSLATED) |
| 1 | 0 | 1 | "11" (TRANSLATED) |
| OTHERS || 0 | INPUT ADRESS (UNTRANSLATED) |
| OTHERS || 1 | INPUT ADRESS (UNTRANSLATED) |

FIG.15

| INPUT ADRESS (BIT 14) | INVERT FLAG 131 | OUTPUT ADRESS (BIT 14) |
|---|---|---|
| 0 | 0 | "0" (UNTRANSLATED) |
| 0 | 1 | "1" (TRANSLATED) |
| OTHERS | 0 | INPUT ADRESS (UNTRANSLATED) |
| OTHERS | 1 | INPUT ADRESS (UNTRANSLATED) |

ADDRESS TRANSLATION CIRCUIT FOR A CPU

CROSS REFERENCES TO RELATED APPLICATIONS

The present invention contains subject matter related to Japanese Patent Application JP 2008-047145 filed in the Japan Patent Office on Feb. 28, 2008, the entire contents of which being incorporated herein by reference.

BACKGROUND OF THE INVENTION

1. Field of the Invention

The present invention relates to an address translation circuit. More particularly, the invention relates to an address translation circuit for switching address spaces through address translation.

2. Description of the Related Art

There are cases where ordinary processors containing a CPU (central processing unit) core each are later furnished with an additional cache memory arrangement for speed enhancement. For these processors, simply preparing programs without being aware of the added cache can lead to various problems. For example, an indifferently prepared program may let its infrequently-used program functions be held in the cache memory. This will result in a reduced cache hit rate of the entire program and hamper the effort for speed enhancement.

Some systems with additionally-equipped cache memory desire that programs having run on the previous hardware with no cache be run on the new hardware with no modifications (i.e., upward compatibility desired). To utilize the added cache effectively entails rewriting the programs. Simply adding a cache memory feature to hardware may thus involve preparing two kinds of programs, programs prepared to maintain upward compatibility, and programs arranged to use the cache memory effectively.

The problems above are resolved typically by dynamically switching the use and nonuse of cache memory for access to certain address areas. Such dynamic switching is carried out illustratively using a TLB (translation look-aside buffer) feature. The TLB is a buffer that permits translation between virtual and physical addresses. Specifically, the input virtual address is compared with the virtual addresses of the entries in the buffer. In the case of a match, the physical address of the matching entry is output (as described illustratively in Japanese Patent No. 2704112, FIGS. 2A and 2B).

SUMMARY OF THE INVENTION

Through dynamic address translation, the above-mentioned TLB feature provides dynamic switching between the use and nonuse of cache memory. However, building a TLB desires numerous comparators and register arrays often leading to a bloated circuit scale.

The embodiments of the present invention have been made in view of the above circumstances and provide an address translation circuit that performs dynamic address translation using a simplified structure.

In carrying out the embodiments of the present invention and according to one embodiment thereof, there is provided an address translation circuit including area address holding means for holding at least part of a translation target address as an area address; translation flag holding means for holding a translation flag specifying whether or not the translation target address is to be translated; match detection means for detecting a match between a predetermined part of at least one bit in an input address on the one hand, and the area address held by the area address holding means on the other hand; and translation means, if a match is detected by the match detection means and if the translation flag held by the translation flag holding means specifies that the translation target address is to be translated, for translating the input address into an address paired with the input address before outputting the paired address. This embodiment translates a given input address into its paired address depending on what is held by the area address holding means and by the translation flag holding means.

According to another embodiment of the present invention, there is provided an address translation circuit including area address holding means for holding at least part of a translation target address as an area address; invert flag holding means for holding an invert flag specifying whether or not part of the translation target address is to be inverted; match detection means for detecting a match between a predetermined part of at least one bit in an input address on the one hand, and the area address held by the area address holding means on the other hand; and bit inversion means, if a match is detected by the match detection means and if the invert flag held by the invert flag holding means specifies that part of the translation target address is to be inverted, for inverting a predetermined bit part in the input address before outputting the bit-inverted address. This embodiment inverts a predetermined bit part in a given input address and outputs the bit-inverted address depending on what is held by the area address holding means and by the invert flag holding means.

According to an even further embodiment of the present invention, there is provided an address translation circuit for translating addresses of a storage device which has a first address space for access to a first storage device and a second address space for access to a second storage device, the address translation circuit including area address holding means for holding at least part of a translation target address as an area address; translation flag holding means for holding a translation flag specifying whether or not the translation target address is to be translated; match detection means for detecting a match between a predetermined part of at least one bit in an input address on the one hand, and the area address held by the area address holding means on the other hand; and translation means, if a match is detected by the match detection means and if the translation flag held by the translation flag holding means specifies that the translation target address is to be translated, for translating the input address into an address paired with the input address and covered by either of the first and the second address spaces which applies to the paired address, before outputting the paired address. This embodiment translates a given input address into its paired address applicable to either of the first and the second address spaces depending on what is held by the area address holding means and by the translation flag holding means.

According to an even further embodiment of the present invention, there is provided an address translation circuit for translating addresses of a storage device which has a first address space for direct access to a main storage device and a second address space for access to the main storage device via a cache memory, the address translation circuit including area address holding means for holding at least part of a translation target address as an area address; translation flag holding means for holding a translation flag specifying whether or not the translation target address is to be translated; match detection means for detecting a match between a predetermined part of at least one bit in an input address on the one hand, and the area address held by the area address holding means on the other hand; and translation means, if a match is detected by the match detection means and if the translation flag held by the translation flag holding means specifies that the translation target address is to be translated, for translating the input address into an address paired with the input address and covered by either of the first and the second address spaces which applies to the paired address, before outputting the paired address. Depending on what is held by the area address holding means and by the translation flag hold section, this embodiment translates a given input address into its paired address applicable to either of the first and the second address spaces, the first address space enabling direct access to the main storage device, the second address space permitting access to the main storage device via the cache memory.

When the embodiments of the present invention are embodied as outlined above, it is possible to implement dynamic address translation by use of a simplified structure.

BRIEF DESCRIPTION OF THE DRAWINGS

FIG. 5 is a schematic view showing a truth table applicable to the address translation feature as the first embodiment of the invention;

FIG. 7 is a schematic view showing a truth table applicable to an address translation feature practiced as a second embodiment of the invention;

FIG. 9 is a schematic view showing how virtual areas are typically structured for embodiments of the invention;

FIG. 12 is a schematic view showing a truth table applicable to the address translation feature as the third embodiment of the invention;

FIG. 15 is a schematic view showing a truth table applicable to the address translation feature as the fourth embodiment of the invention.

DESCRIPTION OF THE PREFERRED EMBODIMENTS

The preferred embodiments of the present invention will now be described in detail with reference to the accompanying drawings.

Figure 1:
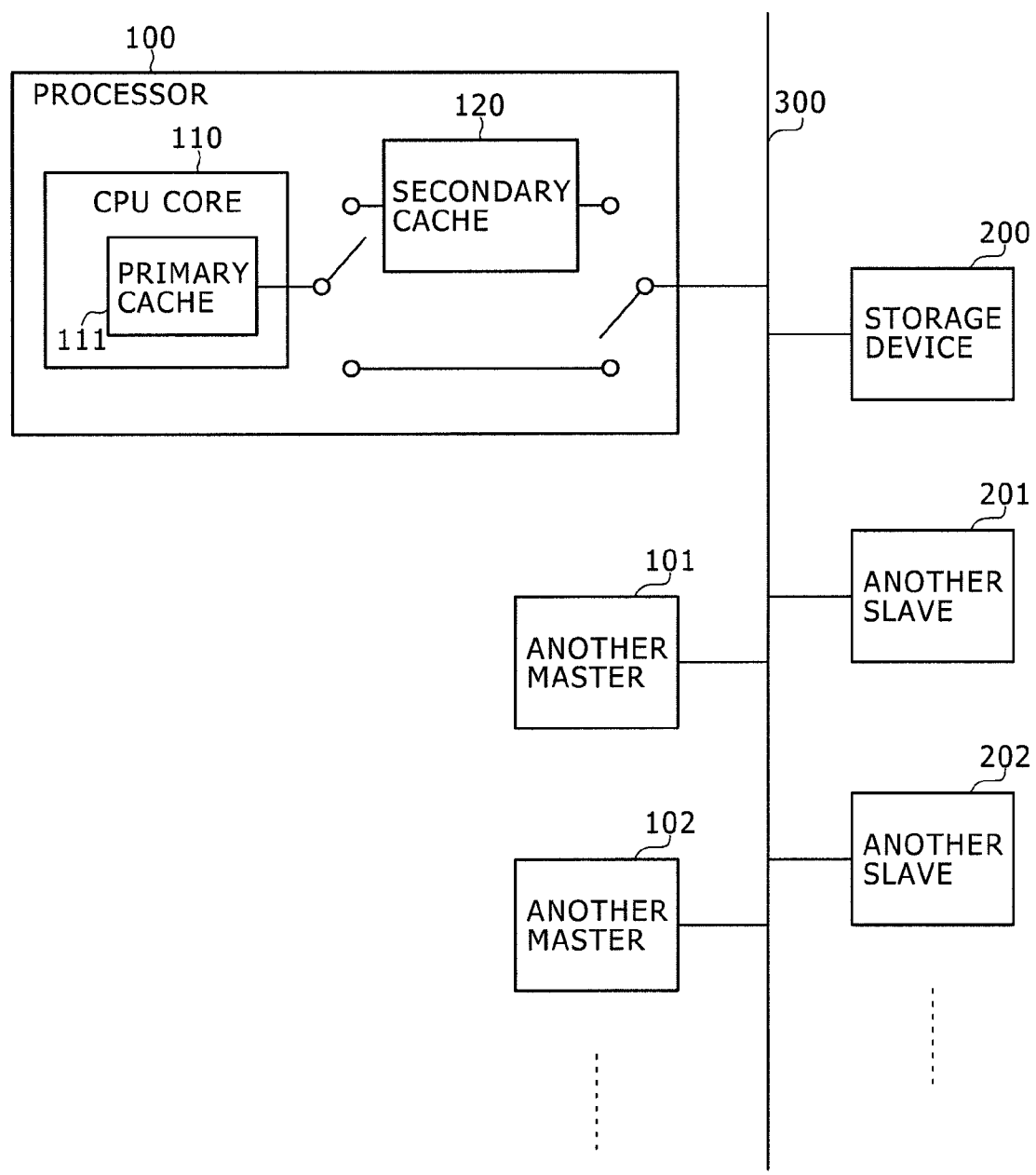
FIG. 1 is a schematic view showing a typical configuration of an information processing system serving as the premise for embodiments of the present invention.

FIG. 1 schematically shows a typical configuration of an information processing system serving as the premise for embodiments of the present invention. The information processing system is composed of a processor 100 acting as a master and of a storage device 200 as a slave, the components being interconnected by a bus 300. Other masters 101 and 102 in addition to the processor 100 may be constituted by another processor and an LCD (liquid crystal display) controller. Other slaves 201 and 202 in addition to the storage device 200 may include a group of registers and peripheral equipment.

The storage device 200 constitutes a main storage device that may be accessed by a plurality of masters (100 through 102) via the bus 300. The processor 100 as a master gains access to the storage device 200 for data processing. The processor 100 has a CPU core 110 by which to access the storage device 200.

It is assumed that the CPU core 110 includes a primary cache memory 111. In operation, as long as the primary cache memory 111 is hit, the CPU core 110 performs its processing in conjunction with the primary cache memory 111. When the primary cache memory 111 is missed, the CPU core 110 gains access to the outside.

It is also assumed that the processor 100 includes a secondary cache memory 120. The secondary cache memory 120 is added inside the processor 100. The programs that had been run on the processor 100 before the secondary cache memory 120 was added are assured of their normal running following the addition (i.e., upward compatibility is ensured). In operation, if the primary cache memory 111 is missed and if the secondary cache memory 120 is available, then the CPU core 110 accesses the secondary cache memory 120. If the secondary cache memory 120 is hit, the CPU core 110 performs its processing in connection with the secondary cache memory 120. When the secondary cache memory 120 is missed, the CPU core 110 accesses the storage device 200.

It might happen that the secondary cache memory 120 contains the same data as that in the storage device 200 which is to be accessed by the CPU core 110. In that case, access is made actually to the secondary cache memory 120; access to the secondary cache memory 120 is made with a shorter latency than access to the storage device 200. Since the storage device 200 may be accessed by a plurality of masters in congested fashion as mentioned above, the use of the secondary cache memory 120 contributes to shortening the latency time upon access.

Access requests made by the CPU core 110 fall into two categories, those made directly to the storage device 200 for access to its address area, and those carried out by way of the secondary cache memory 120.

Figure 2A:
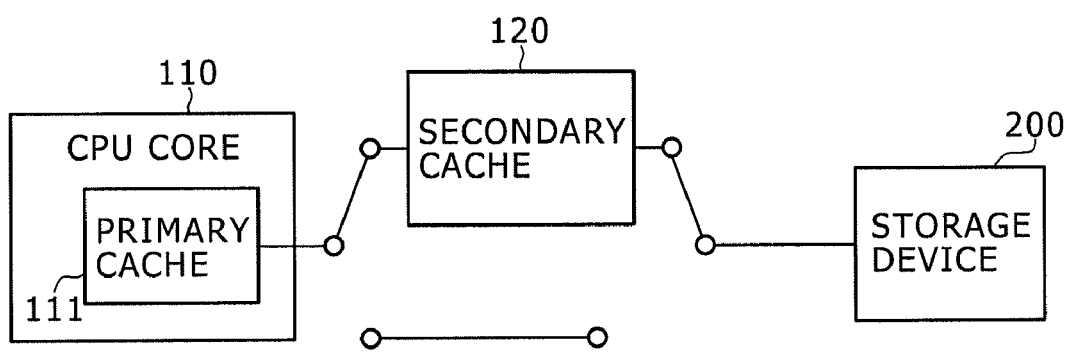
FIGS. 2A and 2B are schematic views showing different paths for access to a storage device for embodiments of the invention.
Figure 2B:
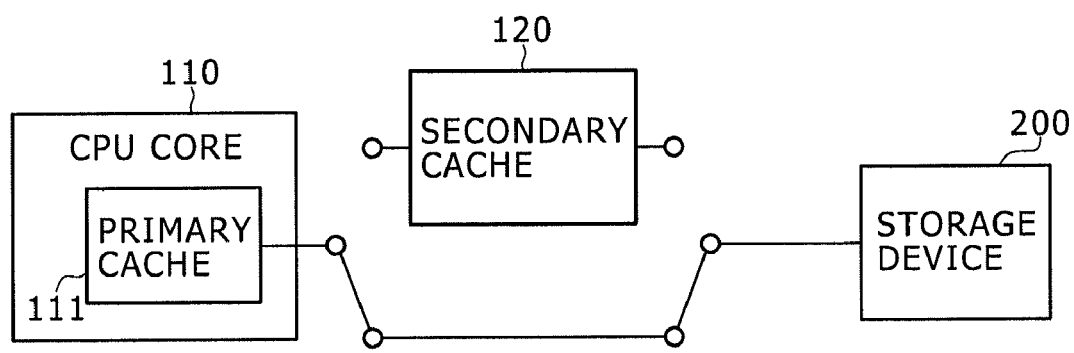

FIGS. 2A and 2B schematically show different paths for access to the storage device 200 for embodiments of the invention. FIG. 2A shows a typical path of access from the CPU core 110 to an address area cached by the second cache memory 120. The data in this address area is held by the secondary cache memory 120, as long as the secondary cache memory 120 is hit, the CPU core 110 performs its processing in conjunction with the secondary cache memory 120. If the secondary cache memory 120 is missed, then the CPU 110 accesses the storage device 200.

FIG. 2B shows a typical path of access from the CPU core 110 to an address area uncached by the secondary cache memory 120. Regarding the data items in this address area which are not retained by the secondary cache memory 120, the CPU core 110 typically gains access to the storage device 200 directly.

Where embodiments of the invention are practiced, the switch between these access paths is controlled using a control register in the CPU core 110.

Figure 3:
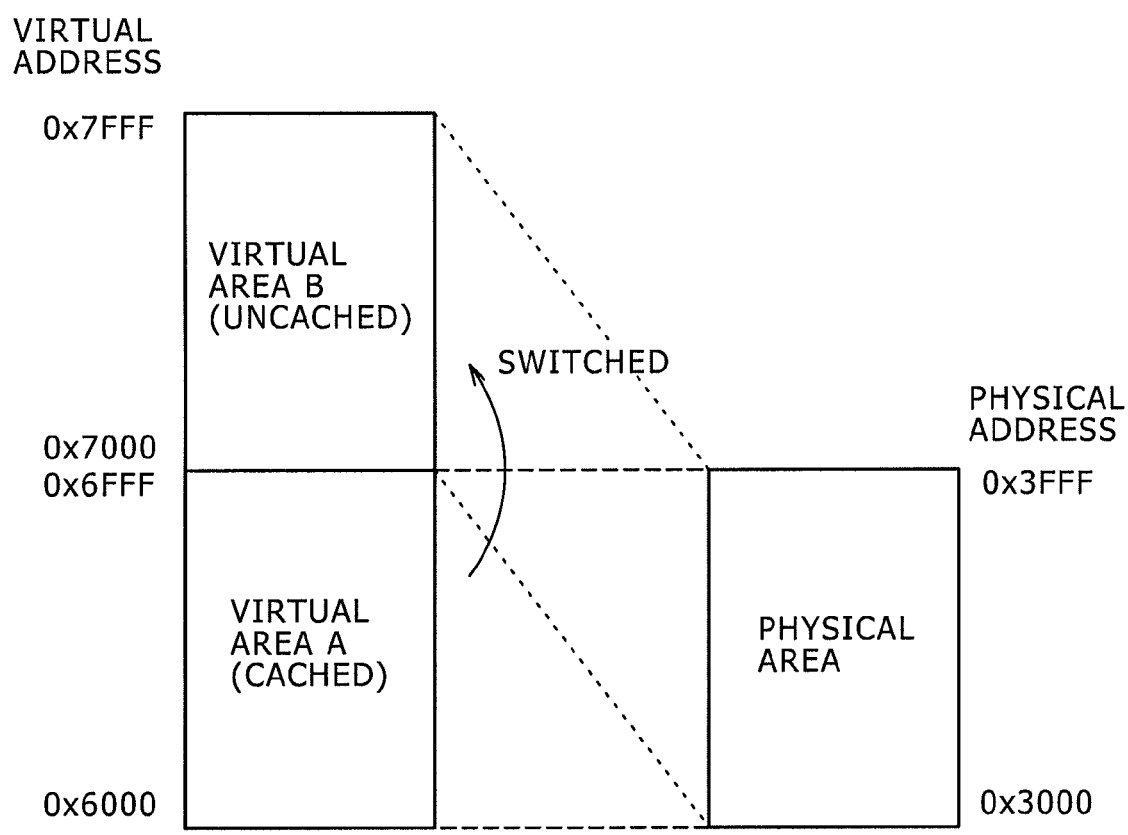
FIG. 3 is a schematic view showing a first example of switched paths for access to the storage device for embodiments of the invention.

FIG. 3 schematically shows a first example of switched paths for access to the storage device 200 for embodiments of the invention. In the example of FIG. 3, a 32K space expressed in 15 bits is assumed. A 4K space from address "0x6000" ("0x" indicates that the following number is hexadecimal) to address "0x6FFF," and another 4K space from address "0x7000" to address "0x7FFF" are both assumed to be assigned to the same physical area ranging from address "0x3000" to address "0x3FFF." It is also assumed that a virtual area A of the 4K space from address "0x6000" to address "0x6FFF" is an area cached by the secondary cache and that a virtual area B of the 4K space from address "0x7000" to address "0x7FFF" is an area uncached by the secondary cache.

That is, if the virtual area A (from address "0x6000" to address "0x6FFF") is designated for access to a location in the physical area (from address "0x3000" to address "0x3FFF"), access is made by way of the secondary cache memory 120. If the virtual area B (from address "0x7000" to address "0x7FFF") is designated, then access is made directly to the storage device 200 without going through the secondary cache memory 120.

In the example of FIG. 3, if the control register specifies that access to an address in the virtual area A is to be inverted, then access to the address of interest in the virtual address A is switched to an address paired with that address in the virtual area B. As a result, access is made directly to the storage device 200 without going through the secondary cache memory 120. It should be noted that the physical address to be actually accessed remains the same.

Figure 4:
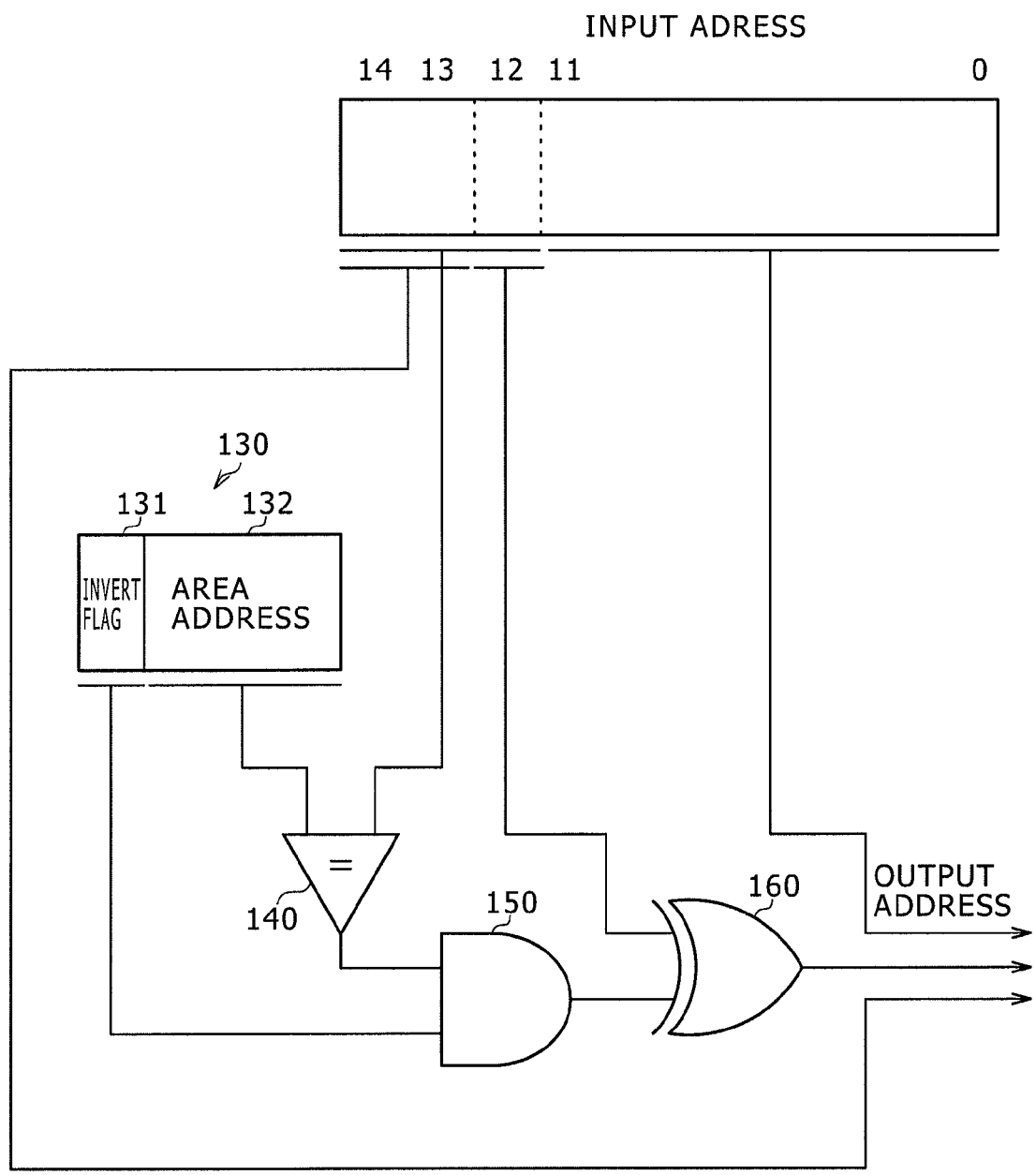
FIG. 4 is a schematic view showing an address translation feature practiced as a first embodiment of the invention.

FIG. 4 schematically shows an address translation feature practiced as the first embodiment of the invention. The address translation feature as part of the CPU core 110 includes a control register 130, a comparator 140, an AND circuit 150, and an exclusive-OR circuit 160.

The control register 130, which holds address translation settings, contains an invert flag 131 and an area address 132. The invert flag 131 specifies whether bit inversion is to be performed for the address that matches the corresponding area address 132. The area address 132 holds the address of the area to be detected. In the address space example of FIG. 3, three bits "110" ranging from bit 14 to bit 12 in the input address are held in the area address 132 in order to detect access to the virtual area A. It is preferred that the content of the control register 130 be protected against arbitrary changes by the general user. The content of the control register 130 should merely be modified in privileged mode, with ordinary programs kept inactive.

The comparator 140 is designed to detect a match between the input address and the area address 132. In this example, three bits ranging from bit 14 through bit 12 in the input address are compared with the three bits held in the area address 132. If bits 14 through 12 in the input address are "110," then a match is detected.

The AND circuit 150 is intended to AND the output of the comparator 140 and that of the invert flag 131. If the comparator 140 detects an address match and if the invert flag 131 specifies that bit inversion is to be performed, then the AND circuit 150 gives a "true" output; otherwise the AND circuit 150 gives a "false" output.

The exclusive-OR circuit 160 is designed to XOR bit 12 of the input address and the output of the AND circuit 150. That is, if the output of the AND circuit 150 is "true," the exclusive-OR circuit 160 translates the input address into a paired address in which bit 12 of the input address is "false"; if the output of the AND circuit 15 is "false," then bit 12 of the input address is left unchanged (i.e., not inverted).

FIG. 5 shows a truth table applicable to the address translation feature as the first embodiment of the invention. In the address space example of FIG. 3, if bit 14 through bit 12 in the input address are "110" and if the invert flag 131 specifies that bit inversion is to be performed (flag "1"), then bit 12 of the input address is inverted. Following the translation, bit 14 through bit 12 in the output address are "111."

If bit 14 through bit 12 in the input address are "110" and if the invert flag 131 specifies that bit inversion is not to be performed (flag "0"), then bit 12 of the input address is not inverted. In this case, the output address coincides with the input address. If bit 14 through bit 12 in the input address are other than "110," bit inversion does not take place either.

As described, only if the invert flag 131 specifies the execution of bit inversion and access is made to the virtual area A, does address translation take place for access to the virtual area B. Access to the appropriate virtual area is performed in accordance with the output address. Upon access to the storage device 200, the virtual address is translated into the corresponding physical address. With the first embodiment, the bit part ranging from bit 14 to bit 12 of the output address is shifted right one bit position in order to set "0" to bit 14 thereby constituting the physical address.

Figure 6:
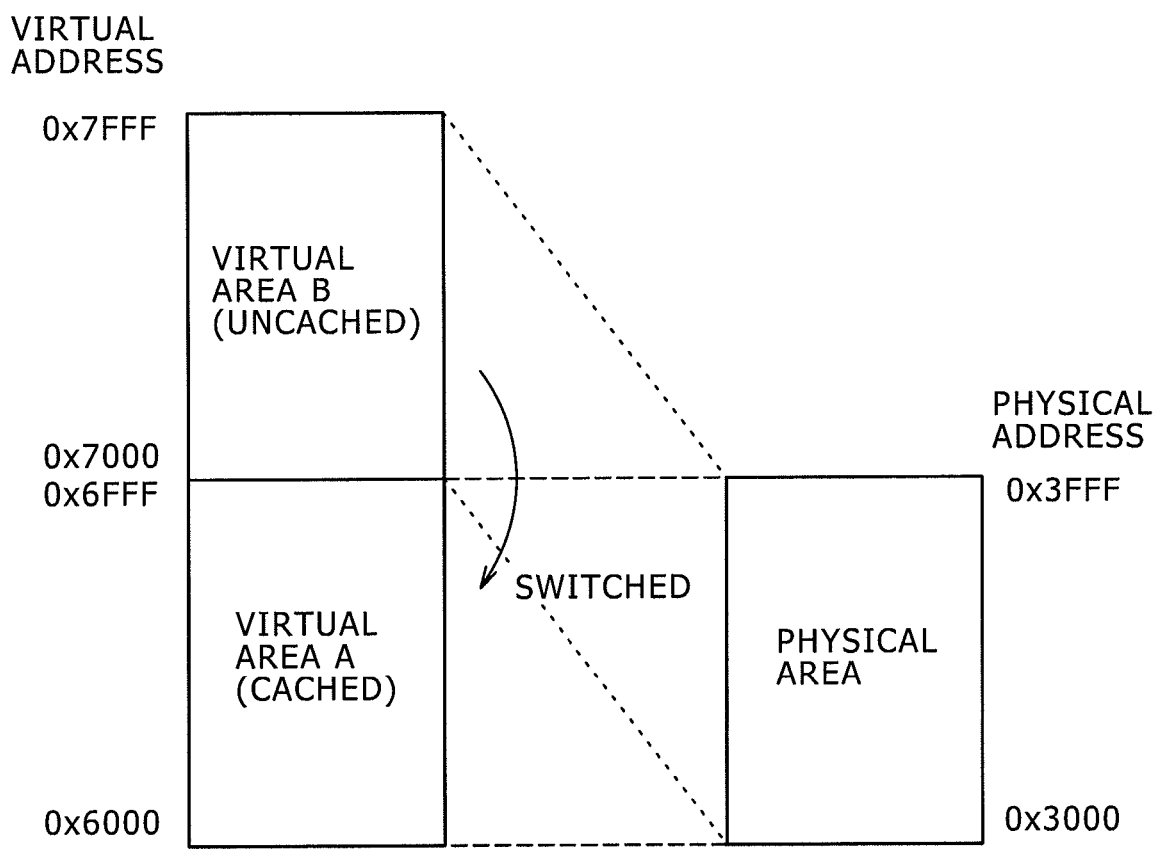
FIG. 6 is a schematic view showing a second example of switched paths for access to the storage device for embodiments of the invention.

FIG. 6 schematically shows a second example of switched paths for access to the storage device 200 for embodiments of the invention. As in the first example of switched path for access, the second example assumes that the virtual area A from address "0x6000" to address "0x6FFF" and the virtual area B from address "0x7000" to address "0x7FFF" are assumed in the 32K space.

In the example of FIG. 6, if the control register specifies that access to an address in the virtual area B is to be inverted, then access to the address of interest in the virtual address B is switched to the virtual area A. As a result, access is made to the storage device 200 by way of the secondary cache memory 120. The physical address to be actually accessed remains the same.

FIG. 7 schematically shows a truth table applicable to an address translation feature practiced as the second embodiment of the invention. In the address space of FIG. 6, if bit 14 through bit 12 in the input address are "111" and if the invert flag 131 specifies that bit inversion is to be performed (flag "1"), then bit 12 of the input address is inverted. Following the translation, bit 14 through bit 12 of the output address are "110."

If bit 14 through bit 12 in the input address are "111" and if the invert flag 131 specifies that bit inversion is not to be performed (flag "0"), then bit inversion is not carried out. In this case, the output address coincides with the input address. If bit 14 through bit 12 in the input address are other than "111," bit inversion does not take place either.

As described, only if the invert flag 131 specifies the execution of bit inversion and access is made to the virtual area B, does address translation take place for access to the virtual area A. Access to the appropriate virtual area is performed in accordance with the output address. Upon access to the storage device 200, the virtual address is translated into the corresponding physical address. With the second embodiment, the bit part ranging from bit 14 to bit 12 of the output address is shifted right one bit position in order to set "0" to bit 14 thereby constituting the physical address.

The address translation feature practiced as the second embodiment of the invention is structured the same as the first embodiment shown in FIG. 4. It should be noted that whereas bits "110" are set in the area address 132 of the control register 130 for the first embodiment, bits "111" are set in the area address 132 of the control register 130 for the second embodiment.

Figure 8A:
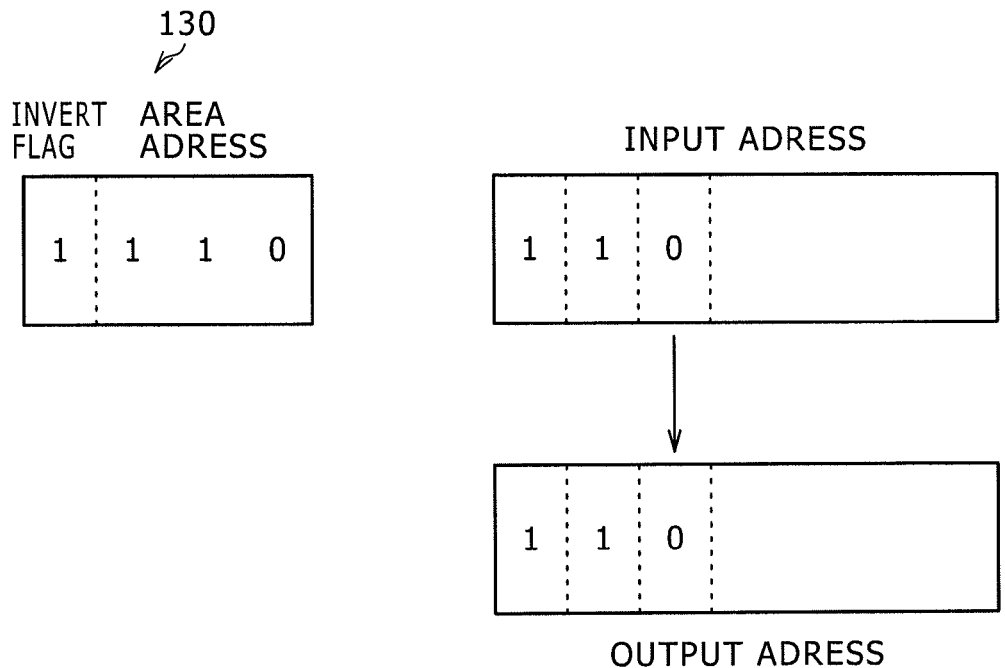
FIGS. 8A and 8B are schematic views showing how addresses are translated by the address translation feature as the first or the second embodiment of the invention.
Figure 8B:
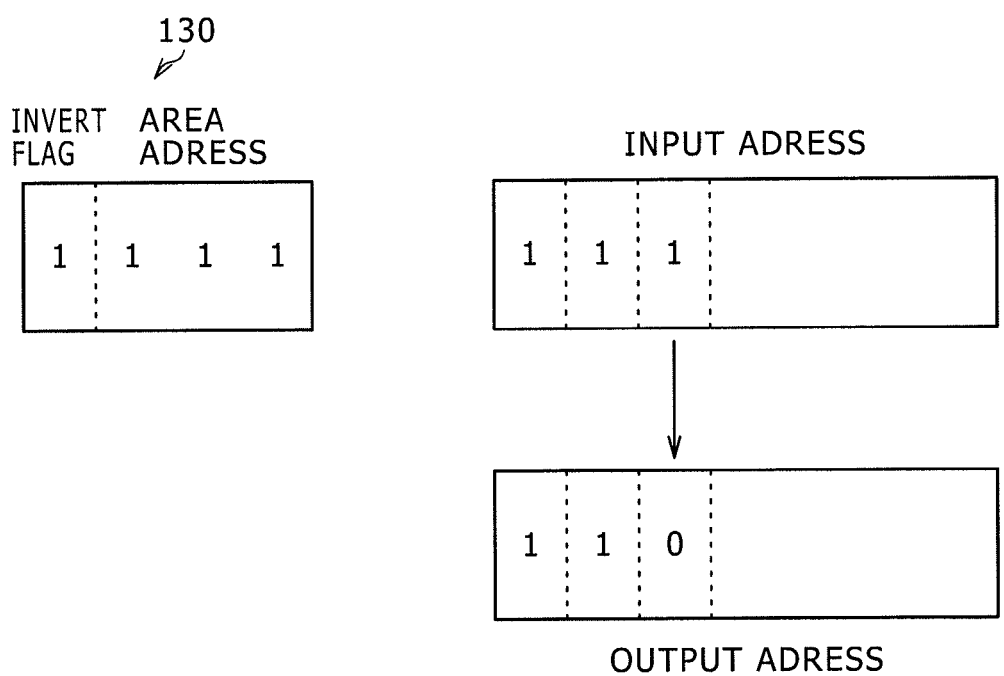

FIGS. 8A and 8B schematically show how addresses are translated by the address translation feature as the first or the second embodiment of the invention. The setup of FIG. 8A corresponds to the address translation feature as the first embodiment in which the area address is set to "110." If an address whose bits 14 through 12 are "110" is input, then an address of "111" is output. That is, access to the virtual area A is translated into access to the virtual area B.

The setup of FIG. 8B corresponds to the address translation feature as the second embodiment in which the area address is set to "111." If an address whose bits 14 through 12 are "111" is input, then an address of "110" is output. In this case, access to the virtual area B is translated into access to the virtual area A.

The control register 130 may be arranged to hold a plurality of pairs of the invert flag 131 and area address 132. If that arrangement is in place, then the setups of FIGS. 8A and 8B may be implemented simultaneously so as to switch the virtual areas A and B one from the other.

FIG. 9 schematically shows how virtual areas are typically structured for embodiments of the invention. The example of FIG. 9 assumes a 32K space expressed in 15 bits. Every 4K portion of the space is assigned a different characteristic. The first-half 16K space (ranging from address "0x0000" to address "0x3FFF") is a user area that can be accessed unrestrictedly by the general user. The second-half 16K space (from address "0x4000" to address "0x7FFF") is a kernel area accessible merely by an authorized administrator.

The CPU core 110 not intended to be connected with the secondary cache memory 120 utilizes every other 4K space; the rest of the space is reserved. The first 4K space of the user area (from address "0x0000" to address "0x0FFF") is assumed to be accessed by way of the primary cache memory 111 (cached access). The third 4K space of the user area (from address "0x2000" to address "0x2FFF") is assumed to be accessed without the intervention of the primary cache memory 111 (uncached access). Similarly, the first 4K space of the kernel area (from address "0x4000" to address "0x4FFF") is assumed to be accessed by way of the primary cache memory 111 (cached access); and the third 4K space of the kernel area (from address "0x6000" to address "0x6FFF") is assumed to be accessed without the intervention of the primary cache memory 111 (uncached access).

If the secondary cache memory 120 is connected in the example of FIG. 9, then cached or uncached access may be designated for each 4K space. The first-half 8K space of the user area (from address "0x0000" to address "0x1FFF") is accessed by way of the primary cache memory 111 (cached access). The second-half 8K space of the user area (from address "0x2000" to address "0x3FFF") is accessed without the intervention of the primary cache memory 111 (uncached access). Likewise, the first-half 8K space of the kernel area (from address "0x4000" to address "0x5FFF") is accessed by way of the primary cache memory 111 (cached access). The second-half 8K space of the kernel area (from address "0x6000" to address "0x7FFF") is accessed without the intervention of the primary cache memory 111 (uncached access). With regard to the secondary cache memory 120, cached or uncached access is switched from one 4K space to the next. That is, odd-numbered 4K spaces (from address "0x0000" to address "0x0FFF"; from address "0x2000" to address "0x2FFF"; from address "0x4000" to address "0x4FFF"; and from address "0x6000" to address "0x6FFF") are accessed by way of the secondary cache memory 120 (cached access). Even-numbered 4K spaces (from address "0x1000" to address "0x1FFF"; from address "0x3000" to address "0x3FFF"; from address "0x5000" to address "0x5FFF"; and from address "0x7000" to address "0x7FFF") are accessed without the intervention of the secondary cache memory 120 (uncached access). In other words, if the secondary cache memory 120 were connected simply to the CPU core 110, the relations between virtual addresses and the secondary cache memory 120 would be fixed.

By contrast, according to the invention embodied above, the virtual address is translated or not translated depending on the settings in the control register 130, which in turn determines whether or not to make use of the secondary cache memory 120. In the above example, different area addresses 132 in the control register 132 may be set with "000," "001," "010," "011," "100," "101," "110," and "111," with each corresponding invert flag 131 specifying the execution of bit inversion (flag "1"). The settings make it possible to switch the correspondence between a given virtual address and the secondary cache memory 120 in terms of access.

If it is desired to have all access performed by way of the secondary cache memory 120, then the different area addresses 132 in the control register 130 may be set with "001," "011," "101," and "111," with each corresponding invert flag 131 specifying the execution of bit inversion (flag "1"). These settings make it possible to exercise control so that all access is performed by way of the secondary cache memory 120.

If it is desired not to have all access carried out through the secondary cache memory 120, then the different area addresses 132 in the control register 130 may be set with "000," "010," "100," and "110," with each corresponding invert flag 131 specifying the execution of bit inversion (flag "1"). These settings result in exercising control so that all access is not performed by way of the secondary cache memory 120 but made directly to the storage device 200.

From the above example, it is evident that the embodiments of the invention are capable of flexibly managing the user and kernel areas of address space and handling access authority such as the use or nonuse of the primary cache memory for cached or uncached access.

The foregoing example was explained in terms of how to control access to the secondary cache memory 120 for every 4K space. Alternatively, spaces that are mapped to the same physical addresses may be accessed in increments other than 4K spaces, as will be explained later. It is also possible to mix the spaces for cached and uncached access options arbitrarily.

Figure 10:
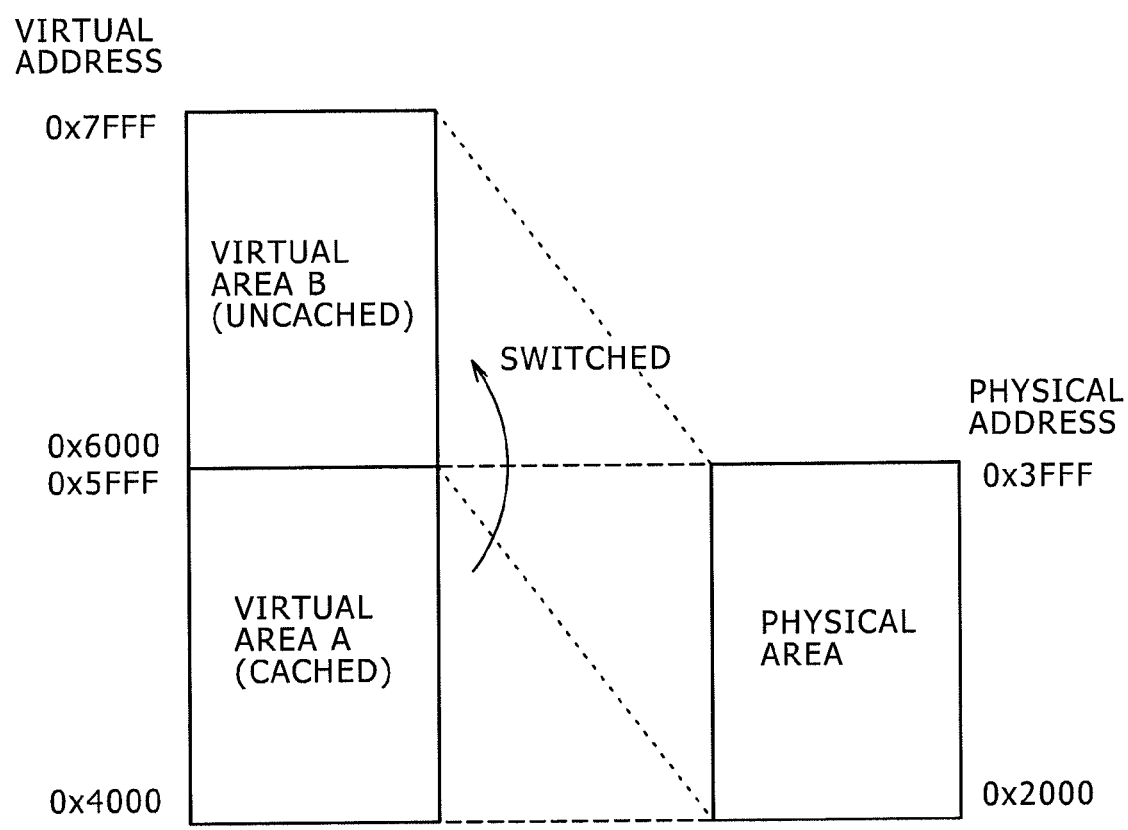
FIG. 10 is a schematic view showing a third example of switched paths for access to the storage device for embodiments of the invention.

FIG. 10 schematically shows a third example of switched paths for access to the storage device 200 for embodiments of the invention. In this example, a 32K space expressed in 15 bits is assumed. An 8K space from address "0x4000" to address "0x5FFF," and another 8K space from address "0x6000" to address "0x7FFF" are both assumed to be assigned to the same physical area ranging from address "0x2000" to address "0x3FFF." It is also assumed that a virtual area A of the 8K space from address "0x4000" to address "0x5FFF" is an area cached by the secondary cache and that a virtual area B of the 8K space from address "0x6000" to address "0x7FFF" is an area uncached by the secondary cache.

That is, if the virtual area A (from address "0x4000" to address "0x5FFF") is designated for access to a location in the physical area (from address "0x2000" to address "0x3FFF"), access is made by way of the secondary cache memory 120.

If the virtual area B (from address "0x6000" to address "0x7FFF") is designated, then access is made directly to the storage device 200 without going through the secondary cache memory 120.

In the example of FIG. 10, if the control register specifies that access to an address in the virtual area A is to be inverted, then access to the address of interest in the virtual address A is switched to the virtual area B. As a result, access is made directly to the storage device 200 without going through the secondary cache memory 120. It should be noted that the physical address to be actually accessed remains the same.

Figure 11:
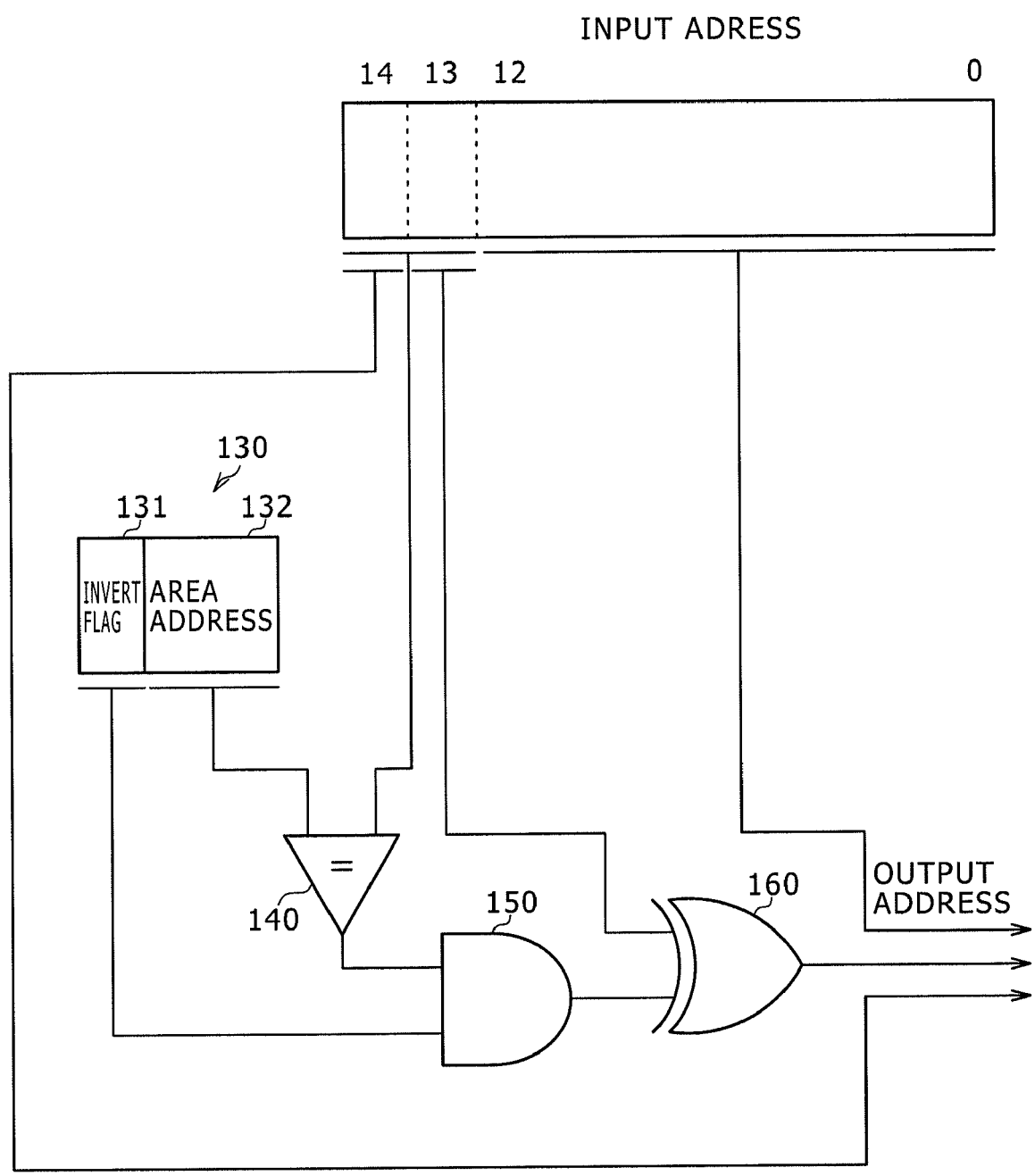
FIG. 11 is a schematic view showing an address translation feature practiced as a third embodiment of the invention.

FIG. 11 schematically shows an address translation feature practiced as the third embodiment of the invention. As with the first embodiment, the address translation feature as the third embodiment constitutes part of the CPU core 110, and includes a control register 130, a comparator 140, an AND circuit 150, and an exclusive-OR circuit 160. It should be noted that the area address 132 in the control register 130 of the third embodiment has a bit width narrower than the area address of the first embodiment. Specifically, in the address space example of FIG. 10, two bits "10" corresponding to bits 14 and 13 of the input address are held in the area address 132 in order to detect access to the virtual area A.

FIG. 12 shows a truth table applicable to the address translation feature as the third embodiment of the invention. In the address space example of FIG. 10, if bits 14 and 13 in the input address are "10" and if the invert flag 131 specifies that bit inversion is to be performed (flag "1"), then bit 13 of the input address is inverted. Following the translation, bits 14 and 13 in the output address are "11."

If bits 14 and 13 in the input address are "10" and if the invert flag 131 specifies that bit inversion is not to be performed (flag "0"), then bit inversion is not carried out. In this case, the output address coincides with the input address. If bits 14 and 13 in the input address are other than "10," bit inversion does not take place either.

As described, only if the invert flag 131 specifies the execution of bit inversion and access is made to the virtual area A, does address translation take place for access to the virtual area B. Access to the appropriate virtual area is performed in accordance with the output address. Upon access to the storage device 200, the virtual address is translated into the corresponding physical address. With the third embodiment, the bit part ranging from bit 14 to bit 13 of the output address is shifted right one bit position in order to set "0" to bit 14 thereby constituting the physical address.

Figure 13:
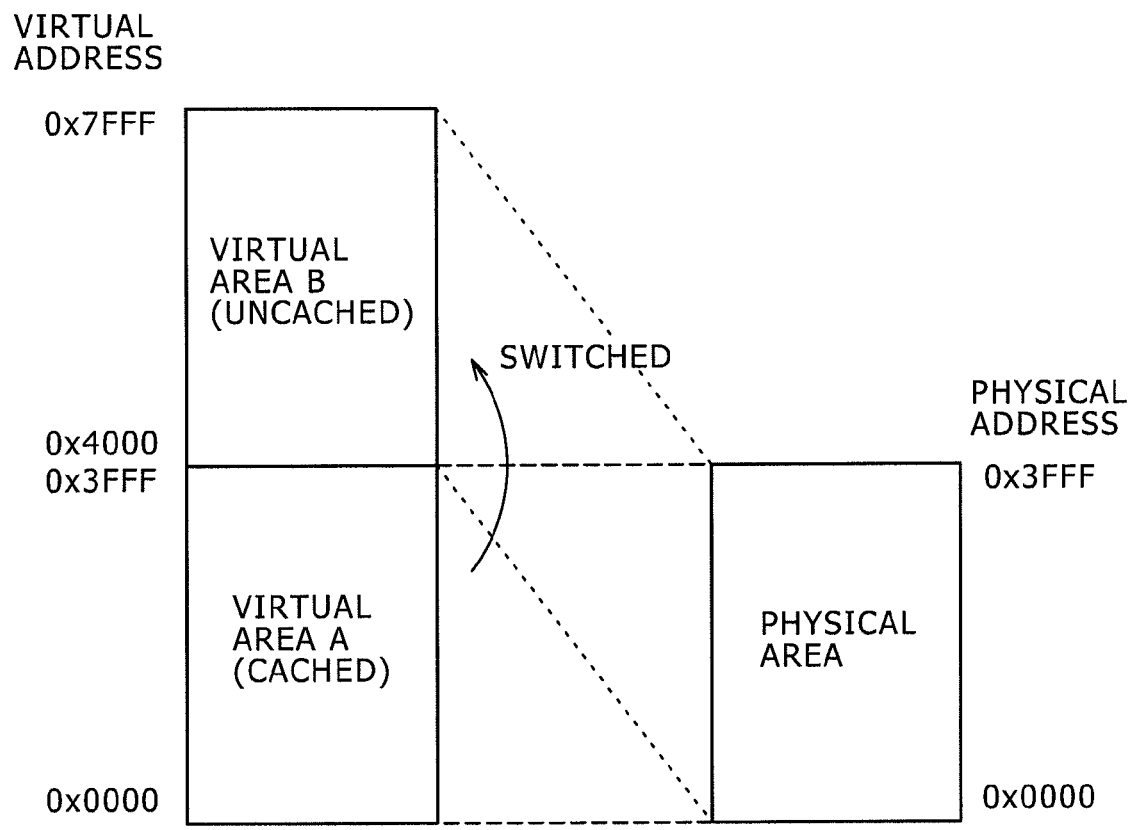
FIG. 13 is a schematic view showing a fourth example of switched paths for access to the storage device for embodiments of the invention.

FIG. 13 schematically shows a fourth example of switched paths for access to the storage device 200 for embodiments of the invention. For the example of FIG. 13, a 32K space expressed in 15 bits is assumed. A 16K space from address "0x0000" to address "0x3FFF," and another 16K space from address "0x4000" to address "0x7FFF" are both assumed to be assigned to the same physical area ranging from address "0x0000" to address "0x3FFF." It is also assumed that the first-half 16K space (virtual area A) is an area cached by the secondary cache and that the second-half 16K space (virtual area B) is an area uncached by the second cache.

That is, if the virtual area A (from address "0x0000" to address "0x3FFF") is designated for access to a location in the physical area (from address "0x0000" to address "0x3FFF"), access is made by way of the secondary cache memory 120. If the virtual area B (from address "0x4000" to address "0x7FFF") is designated, then access is made directly to the storage device 200 without going through the secondary cache memory 120.

In the example of FIG. 13, if the control register specifies that access to an address in the virtual area A is to be inverted, then access to the address of interest in the virtual address A is switched to the virtual area B. As a result, access is made directly to the storage device 200 without going through the secondary cache memory 120. It should be noted that the physical address to be actually accessed remains the same.

Figure 14:
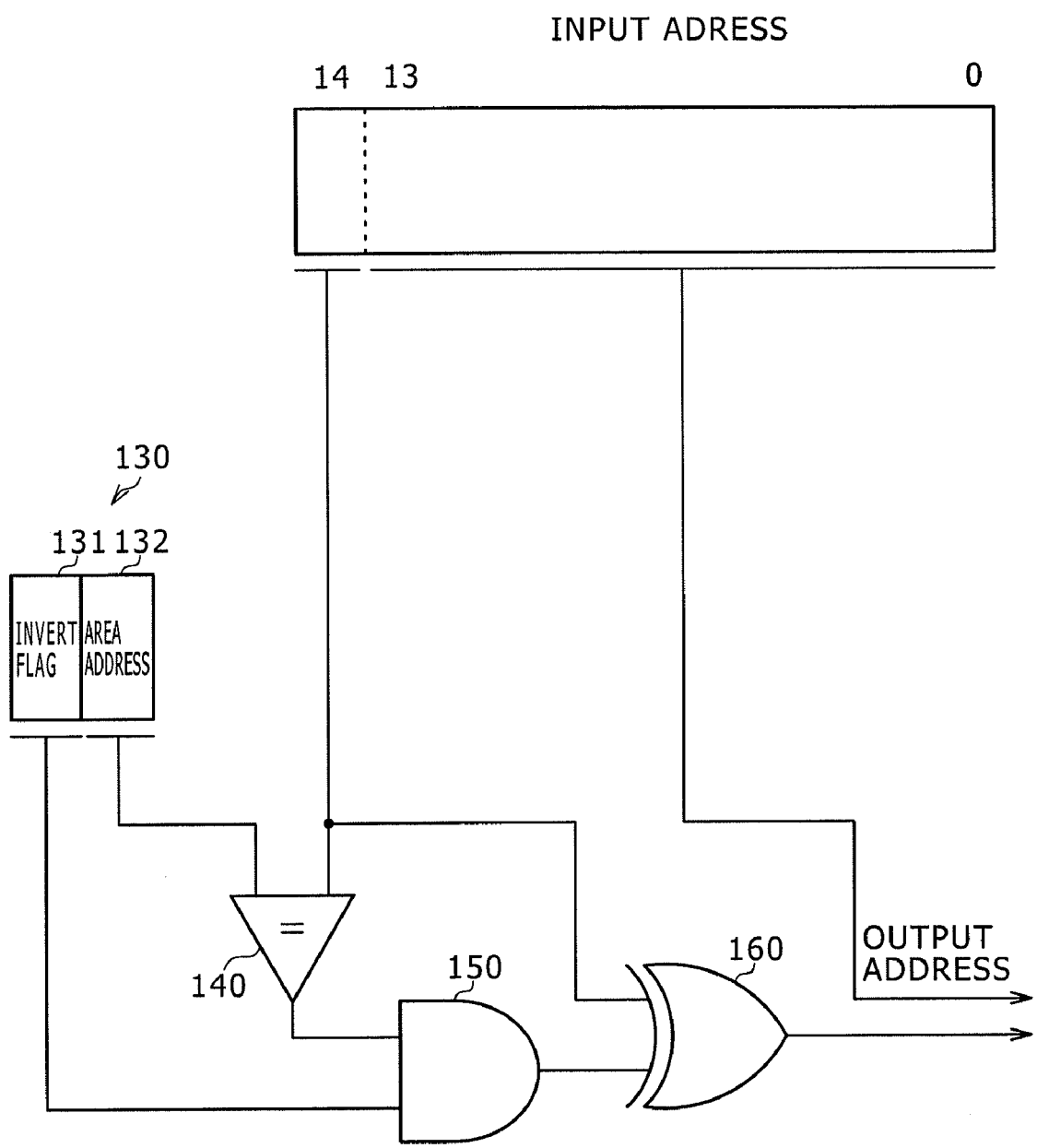
FIG. 14 is a schematic view showing an address translation feature practiced as a fourth embodiment of the invention.

FIG. 14 schematically shows an address translation feature practiced as the fourth embodiment of the invention. As with the first embodiment, the address translation feature as the fourth embodiment constitutes part of the CPU core 110, and includes a control register 130, a comparator 140, an AND circuit 150, and an exclusive-OR circuit 160. It should be noted that the area address 132 in the control register 130 of the fourth embodiment has a bit width narrower than the area address of the first embodiment. Specifically, in the address space example of FIG. 13, one bit "0" corresponding to bit 14 of the input address is held in the area address 132 in order to detect access to the virtual area A.

FIG. 15 shows a truth table applicable to the address translation feature as the fourth embodiment of the invention. In the address space example of FIG. 13, if bit 14 in the input address is "0" and if the invert flag 131 specifies that bit inversion is to be performed (flag "1"), then bit 14 of the input address is inverted. Following the translation, bit 14 in the output address is "1."

If bit 14 in the input address is "0" and if the invert flag 131 specifies that bit inversion is not to be performed (flag "0"), then bit inversion is not carried out. In this case, the output address coincides with the input address. If bit 14 in the input address is other than "0" (i.e., "1"), bit inversion does not take place either.

As described, only if the invert flag 131 specifies the execution of bit inversion and access is made to the virtual area A, does address translation take place for access to the virtual area B. Access to the appropriate virtual area is performed in accordance with the output address. Upon access to the storage device 200, the virtual address is translated into the corresponding physical address. With the fourth embodiment, bit 14 is set to "0" whereby the physical address is constituted.

According to the embodiments of the present invention embodied as described above, when the comparator 140 detects a match between what is set in the area address 132 and the input address, the exclusive-OR circuit 160 inverts a particular bit or bits in keeping with the invert flag 131. The inventive scheme provides dynamic address translation using a simplified structure. Control is thus exercised dynamically over operations in which the use and nonuse of the cache arrangement are changed and access authority is switched between options.

If the address translation feature of the embodiment of the invention were not in use, it would be necessary to prepare two kinds of programs to be run in two different modes, programs to be run in compatible mode to maintain upward compatibility with the hardware in effect before the secondary cache memory was added, and programs to be run in high-speed mode for rapid program execution using the secondary cache memory. Regarding application programs, two kinds of programs would illustratively be desired, those compatible with the secondary cache memory and those incompatible with it. Furthermore, two kinds of operating systems would be desired, a kernel compatible with the secondary cache memory, and a compatible kernel. According to the embodiments of the present invention, it is possible to run programs incompatible with the secondary cache memory using a kernel compatible with the secondary cache memory.

While the embodiment of the invention has been described in conjunction with the foregoing specific embodiments claimed correspondingly in the appended claims as outlined below, these embodiments should not be construed as limiting the scope of the embodiment of the invention but as merely providing illustrations of some of the presently preferred embodiments of this invention. It is evident that many alternatives, modifications and variations will become apparent to those skilled in the art in light of the foregoing description.

For example, one embodiment to be claimed may include area address holding means corresponding to the area address 132 in the control register 130, translation flag holding means corresponding to the invert flag 131 in the control register 130, match detection means corresponding to the comparator 140, and translation means corresponding to the AND circuit 150 and exclusive-OR circuit 160.

Another embodiment to be claimed may illustratively include area address holding means corresponding to the area address 132 in the control register 130, invert flag holding means corresponding to the invert flag 131 in the control register 130, match detection means corresponding to the comparator 140, and bit inversion means corresponding to the AND circuit 150 and exclusive-OR circuit 160.

The series of steps and processes discussed above as part of the embodiments may be construed as methods for carrying out such steps and processes, as programs for causing a computer to execute such methods, or as a recording medium that stores such programs.

It should be understood by those skilled in the art that various modifications, combinations, sub-combinations and alterations may occur depending on design requirements and other factor in so far as they are within the scope of the appended claims or the equivalents thereof.

What is claimed is:

1. An address translation circuit comprising:
    an area address holding section that holds at least part of a translation target address as an area address;
    an invert flag holding section that holds an invert flag specifying whether or not part of said translation target address is to be inverted;
    a match detection section that detects a match between a predetermined part of at least one bit in an input address on the one hand, and said area address held by said area address holding section on the other hand; and
    a bit inversion section that, if a match is detected by said match detection section and if said invert flag held by said invert flag holding section specifies that part of said translation target address is to be inverted, inverts a predetermined bit part in said input address before outputting the bit-inverted address.

* * * * *